(12) United States Patent
Dykstra et al.

(10) Patent No.: US 10,883,340 B2
(45) Date of Patent: Jan. 5, 2021

(54) DOWNHOLE POSITIONING CONTROL SYSTEM WITH FORCE COMPENSATION

(71) Applicant: Halliburton Energy Services, Inc., Houston, TX (US)

(72) Inventors: Jason D. Dykstra, Spring, TX (US); Imiya Manjula Wickramasinghe, Spring, TX (US); Fanping Bu, Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 16/330,293

(22) PCT Filed: Sep. 22, 2016

(86) PCT No.: PCT/US2016/053019
§ 371 (c)(1),
(2) Date: Mar. 4, 2019

(87) PCT Pub. No.: WO2018/056975
PCT Pub. Date: Mar. 29, 2018

(65) Prior Publication Data
US 2019/0257176 A1 Aug. 22, 2019

(51) Int. Cl.
*E21B 41/00* (2006.01)
*E21B 47/00* (2012.01)
(Continued)

(52) U.S. Cl.
CPC .......... *E21B 41/0092* (2013.01); *E21B 19/00* (2013.01); *E21B 47/00* (2013.01);
(Continued)

(58) Field of Classification Search
CPC .... E21B 41/0092; E21B 47/007; E21B 19/00; E21B 47/00; E21B 47/09; E21B 47/07;
(Continued)

(56) References Cited

U.S. PATENT DOCUMENTS 7,819,183 B2  10/2010  Borgstadt
7,841,414 B1  11/2010  Borgstadt
(Continued)

FOREIGN PATENT DOCUMENTS

WO  2015084405 A1  6/2015

OTHER PUBLICATIONS

RU Application Serial No. 2019103398; First Office Action; dated Oct. 4, 2019, 3 pages.
(Continued)

*Primary Examiner* — Brad Harcourt
(74) *Attorney, Agent, or Firm* — Gilliam IP PLLC

(57) ABSTRACT

Methods and systems for controlling the downhole position and velocity of a work string using a downhole position and velocity controller may be configured or otherwise programmed to account for force compensation. For example, the work string may undergo significant length changes like thermal expansion and elongation or contraction due to inertial forces, self-weight, and wellbore pressure. Also, the downhole conditions (e.g., temperature, internal forces, self-weight, and wellbore pressure) can cause the work string to be overloaded and become damaged if fast or sudden manipulations occur. The dynamic model implemented with the downhole position and velocity controller may be configured to account for the downhole forces experienced by the work string due to downhole conditions to provide the position and velocity movements that should occur at the surface to achieve the desired position and velocity movements downhole.

20 Claims, 4 Drawing Sheets

(51) Int. Cl.
*E21B 47/09* (2012.01)
*G01L 5/04* (2006.01)
*G01P 3/00* (2006.01)
*E21B 19/00* (2006.01)
*E21B 47/007* (2012.01)
*E21B 47/06* (2012.01)
*E21B 47/07* (2012.01)

(52) U.S. Cl.
CPC ............ *E21B 47/007* (2020.05); *E21B 47/09* (2013.01); *G01L 5/04* (2013.01); *G01P 3/00* (2013.01); *E21B 47/06* (2013.01); *E21B 47/07* (2020.05)

(58) Field of Classification Search
CPC . E21B 47/06; E21B 41/00; G01L 5/04; G01P 3/00
See application file for complete search history.

(56) References Cited

U.S. PATENT DOCUMENTS

| | | |
|---|---|---|
| 7,845,420 B1 | 12/2010 | Borgstadt |
| 2011/0015862 A1 | 1/2011 | Sato et al. |
| 2012/0123757 A1 | 5/2012 | Ertas et al. |
| 2012/0179428 A1 | 7/2012 | Dykstra et al. |
| 2015/0105912 A1 | 4/2015 | Dykstra |
| 2016/0024847 A1* | 1/2016 | Benson .................... E21B 7/04 175/24 |
| 2016/0348493 A1* | 12/2016 | Hohl ....................... F04C 2/107 |

OTHER PUBLICATIONS

PCT Application Serial No. PCT/US2016/053019, International Search Report, dated Jun. 12, 2017, 3 pages.
PCT Application Serial No. PCT/US2016/053019, International Written Opinion, dated Jun. 12, 2017, 13 pages.
Russian Application Serial No. 2019103398; Notice of Allowance; dated May 26, 2020, 4 pages.

* cited by examiner

DOWNHOLE POSITIONING CONTROL SYSTEM WITH FORCE COMPENSATION

BACKGROUND

The present application relates to methods and systems for controlling the downhole position and velocity of a work string.

In oil and gas well operations, long strings of tubulars (e.g., pipes and coiled tubing), referred to as work strings, are inserted into and removed from wells at various times. When work strings composed of pipes are inserted into a well, a pipe is attached to the top of a work string, and then the work string is lowered into the well. When work strings composed of pipes are removed from a well, a tubular is removed from the top of a work string, then the work string is raised from the well. Depending on the depth of a well, a work string may be thousands of feet long.

In some instances, dual-jacking systems are used to manipulate the work string in and out of the wellbore under automated control. That is, in some instances, the position and velocity associated with moving the work string uphole or downhole along the wellbore to insert or remove the work string is automatically controlled by the dual-jacking system. Conventional dual-jacking systems are concerned with the position and movement of the work string at the surface where the work string enters or exits the wellbore and assumes the same occurs downhole with no change to the work string length.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to methods and systems for controlling the downhole position and velocity of a work string using a downhole position and velocity controller that accounts for force compensation.

In some instances, the work string may undergo significant length changes like thermal expansion and elongation or contraction due to inertial forces, self-weight, and wellbore pressure. Also, the downhole conditions (e.g., temperature, internal forces, self-weight, and wellbore pressure) can cause the work string to be overloaded and become damaged if fast or sudden manipulations occur. The dynamic model implemented with the downhole position and velocity controller of the present disclosure accounts for the downhole forces experienced by the work string due to downhole conditions to provide the position and velocity movements that should occur at the surface to achieve the desired position and velocity movements downhole.

Figure 1:
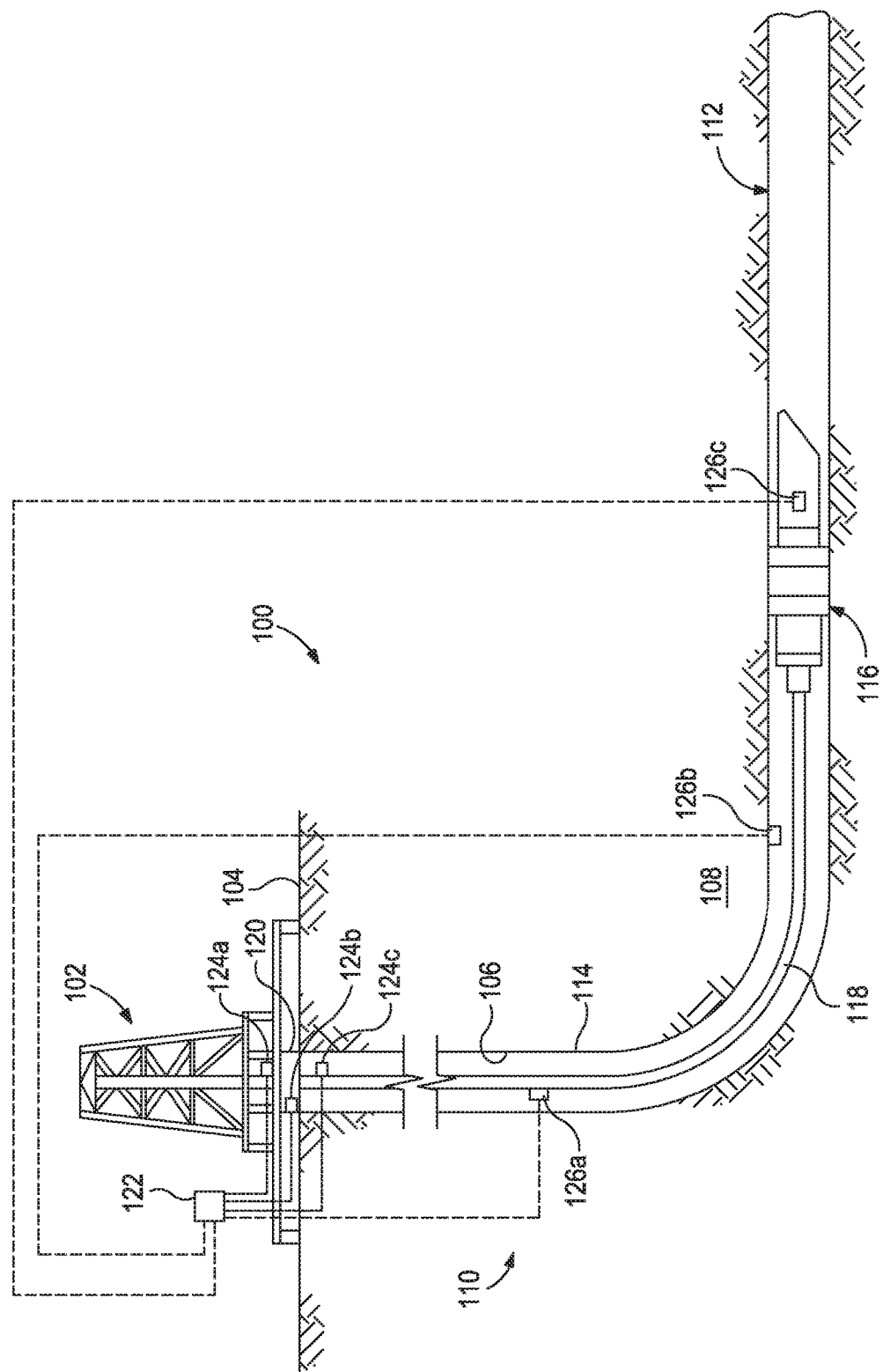
FIG. 1 is a diagram of a well system implementing a downhole position and velocity controller.

FIG. 1 is a diagram of a well system 100 implementing a downhole position and velocity controller of the present disclosure. As illustrated, the well system 100 may include a service rig 102 (also referred to as a "derrick") that is positioned on the earth's surface 104 and extends over and around a wellbore 106 that penetrates a subterranean formation 108. The service rig 102 may be a drilling rig, a completion rig, a workover rig, or the like. In some embodiments, the service rig 102 may be omitted and replaced with a standard surface wellhead completion or installation, without departing from the scope of the disclosure. While the well system 100 is depicted as a land-based operation, it will be appreciated that the principles of the present disclosure could equally be applied in any sea-based or sub-sea application where the service rig 102 may be a floating platform or sub-surface wellhead installation, as generally known in the art.

The wellbore 106 may be drilled into the subterranean formation 108 using any suitable drilling technique and may extend in a substantially vertical direction away from the earth's surface 104 over a vertical wellbore portion 110. At some point in the wellbore 106, the vertical wellbore portion 110 may deviate from vertical relative to the earth's surface 104 and transition into a substantially horizontal wellbore portion 112, although such deviation is not required. That is, the wellbore 106 may be vertical, horizontal, or deviated, without departing from the scope of the present disclosure. In some embodiments, the wellbore 106 may be completed by cementing a string of casing 114 within the wellbore 106 along all or a portion thereof. As used herein, the term "casing" refers not only to casing as generally known in the art, but also to borehole liner, which comprises tubular sections coupled end to end but not extending to a surface location. In other embodiments, however, the string of casing 114 may be omitted from all or a portion of the wellbore 106 and the principles of the present disclosure may equally apply to an "open-hole" environment.

The well system 100 may further include a tool 116 that may be conveyed into the wellbore 106 on a work string 118 (also referred to as a "conveyance") that extends from the service rig 102. The work string 118 may be, but is not limited to, wireline, coiled tubing, drill pipe, production tubing, slickline, electric line, or the like. The work string 118 is coupled to a positioning tool 120 (e.g., a dual-jack) for automated control of the velocity and position movement of the work string 118. The positioning tool 120 is communicably coupled (wired or wirelessly) a positioning tool controller 122 that provides signals that operate the positioning tool 120. The positioning tool controller 122 includes a downhole position and velocity controller of the present disclosure described further in FIGS. 2A-2C.

The well system 100 may include surface sensors 124 that measure surface conditions (e.g., a work string condition, a wellbore pressure, a wellbore temperature, and the like) at or near (e.g., within 100 feet) of the surface 104 (which in an off-shore implementation would be at or near the surface of the seabed). The surface sensors 124 may be positioned in a variety of locations. For example, surface sensor 124a is coupled to the work string 118 at the surface 104, surface sensor 124b is coupled to a portion of the service rig 102, and surface sensor 124c is coupled to the work string 118 near the surface 104. In some instances, a well system 100 may include one or more sensors that are positioned within the well system 100 as being coupled to the work string 118 at or near the surface 104, coupled to the casing at or near the surface 104, coupled to a portion of the service rig 102, or in a combination of the foregoing locations.

Surface sensor 124 may be used for one or more surface conditions, which may include, but are not limited to, a work string condition, a wellbore pressure, a wellbore temperature, and any combination thereof. Exemplary work string conditions may include, but are not limited to, the strain of the work string 118, the torque applied to the work string 118, the rotational speed of the work string 118, the acceleration and/or velocity of the work string 118 being introduced into the wellbore, the positon of the work string 118, the force applied to move the work string 118 along the wellbore, and the like, and any combination thereof. Exemplary surface sensors 124 may include, but are not limited to, strain sensors, acceleration sensors, position sensors, force sensors, pressure sensors, temperature sensors, and the like, and any combination thereof.

The well system 100 may optionally further include downhole sensors 126 that measure downhole conditions, which may include, but are not limited to, the strain of the work string 118, the torque applied to the work string 118, the rotational speed of the work string 118, the acceleration and/or velocity of the work string 118 being introduced into the wellbore, the positon of the work string 118, the force applied to move the work string 118 along the wellbore, the temperature of the fluid in the wellbore 106, the pressure of a fluid in the wellbore 106, and the like, and any combination thereof. The downhole sensors 126 may be positioned in a variety of locations. For example, downhole sensor 126a is coupled to the work string 118, downhole sensor 126b is coupled to the casing (or other liner along the wellbore), and downhole sensor 126c is coupled to the tool 116. In some instances, a well system 100 may include one or more sensors that are positioned within the well system 100 as being coupled to the work string 118, coupled to the casing, coupled to a tool that is coupled to the work string 118, or in a combination of the foregoing locations. Exemplary downhole sensors 126 may include, but are not limited to, strain sensors, acceleration sensors, position sensors, force sensors, pressure sensors, temperature sensors, and the like, and any combination thereof.

The surface sensors 124 and downhole sensors 126 may be communicably coupled (wired or wirelessly) to the positioning tool controller 122 so that the positioning tool controller 122 receives signals from the surface sensors 124 and downhole sensors 126 related to the surface condition or downhole condition the respective sensor measures.

Figure 2A:
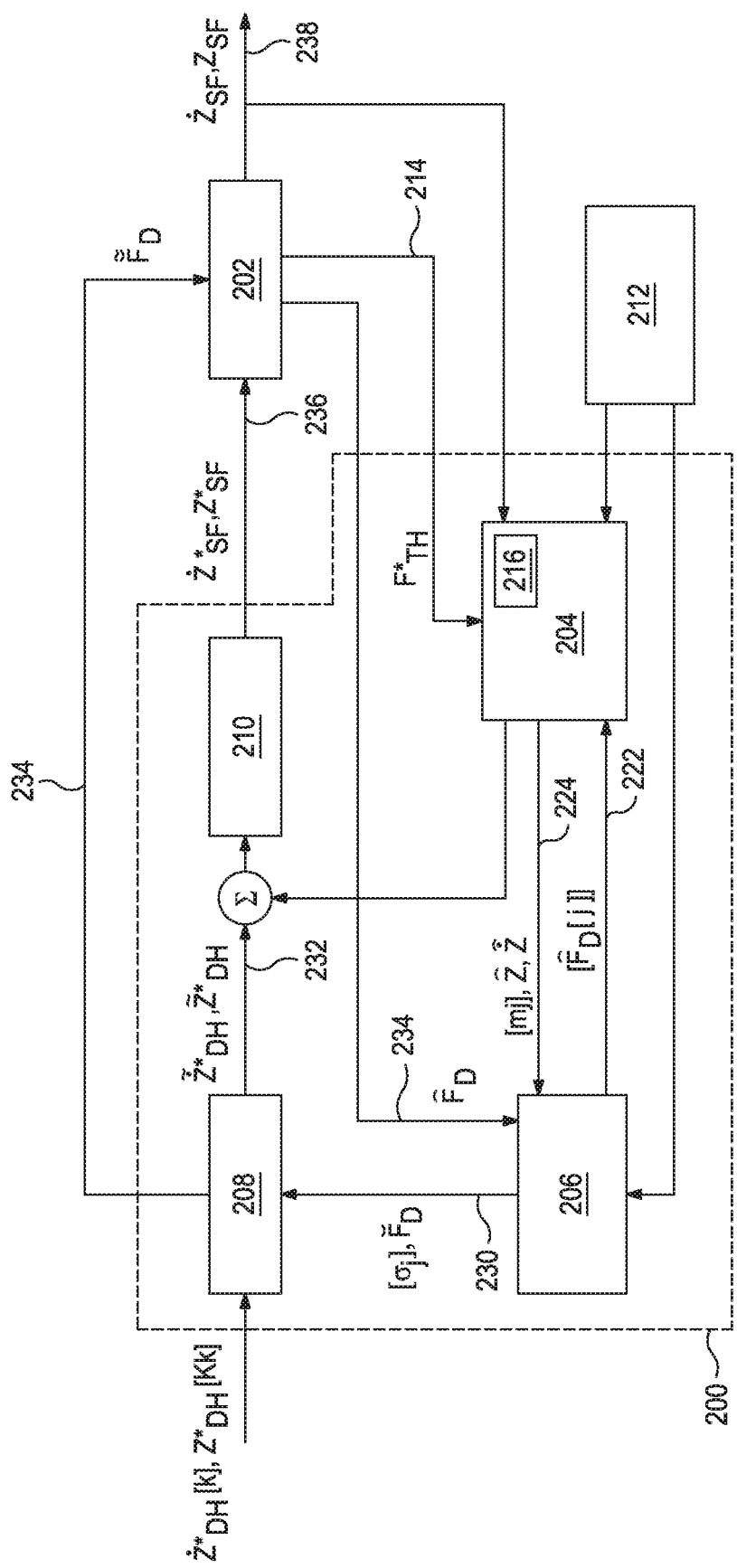
FIG. 2A is an exemplary computational architecture of a downhole position and velocity controller coupled to a work string controller.

FIG. 2A is an exemplary computational architecture (i.e., the design of and interrelationship between the algorithms, modules, components, etc.) of a positioning tool controller (e.g., the positioning tool controller 122 of FIG. 1) that comprises a downhole position and velocity controller 2000 and a work string controller 202. The downhole position and velocity controller 200 comprises four subsystems: an observer 204, a force profile estimator 206, a rate planner 208, and a controller 210. These subsystems work together to produce commands for the work string controller 202.

The observer 204 receives well string inputs 212, which may include, but are not limited to mechanical properties of the well string, geometry of the wellbore, location of the well string (or sections thereof) in the wellbore, measured surface conditions, measured downhole conditions, and the like, and any combination thereof. The observer 204 also continuously receives a traveling head force command 214 ($F^*_{TH}$) from the work string controller 202. The observer 204 utilizes and maintains or otherwise updates a dynamic model 216 of the work string. As used herein, the term "traveling head force" refers to the force applied to the traveling head by the motor.

Figure 2B:
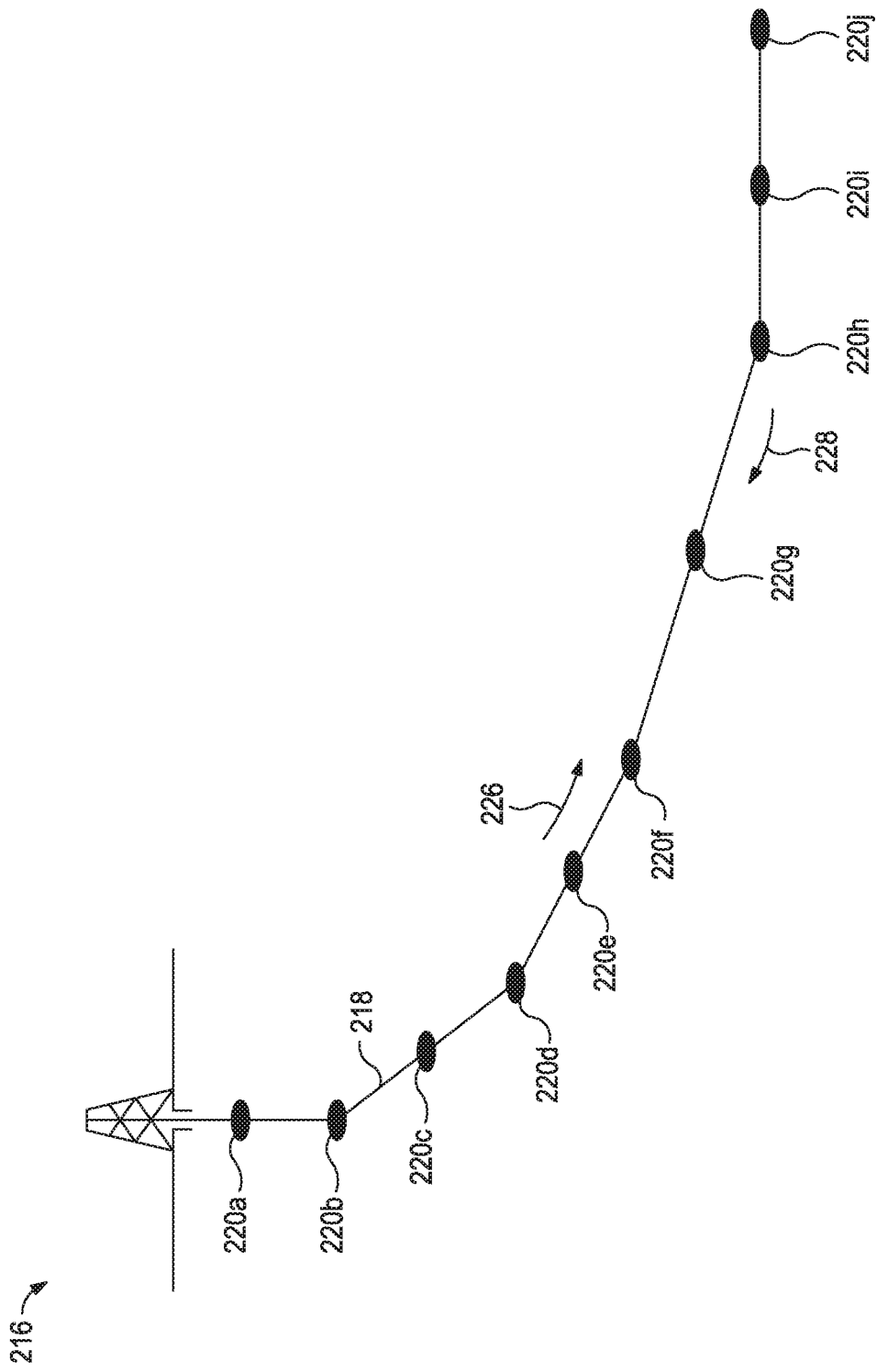
FIG. 2B pictorially illustrates how the dynamic model approximates the work string as a set of interconnected point lumped masses.
Figure 2C:
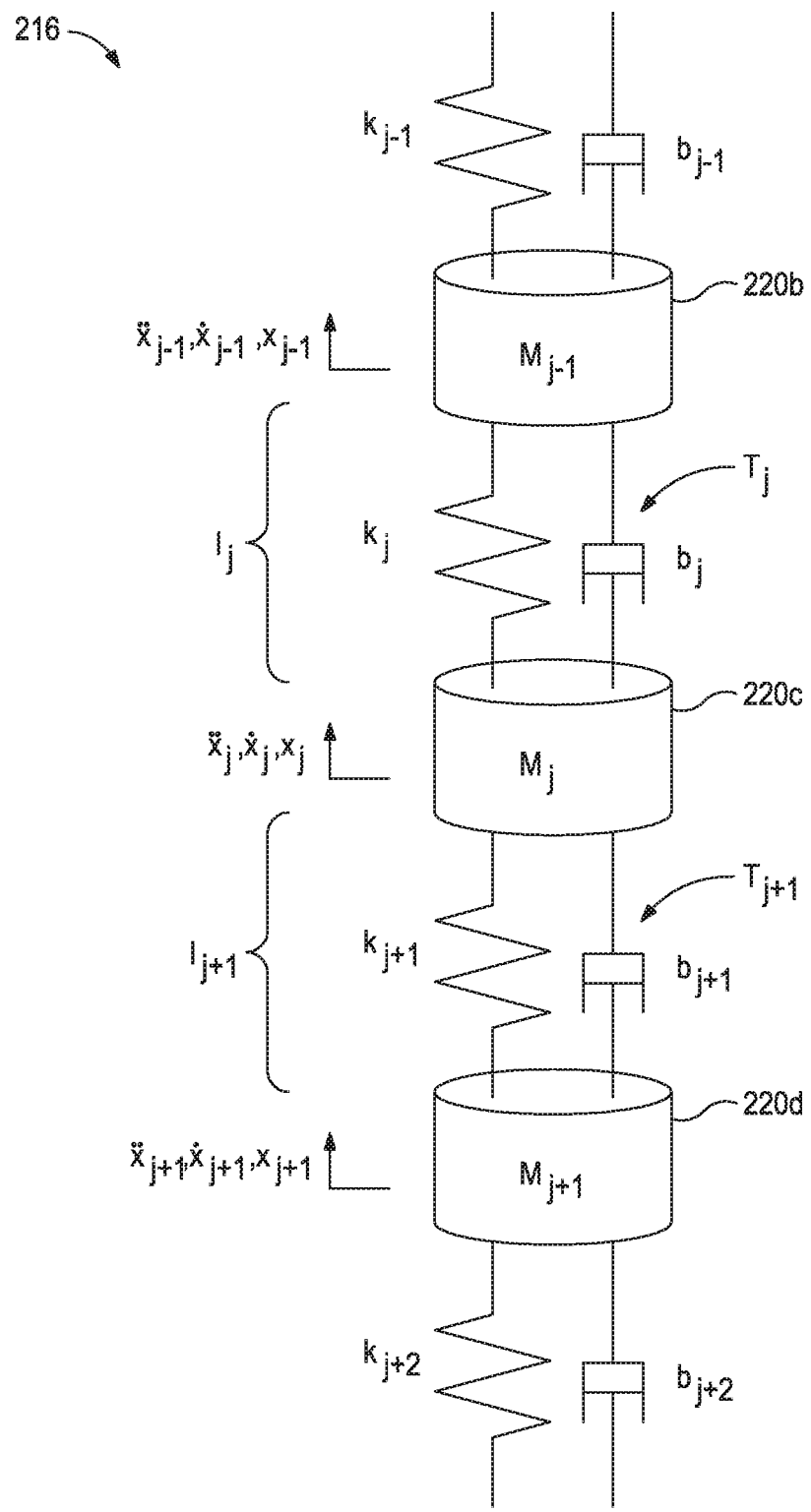
FIG. 2C pictorially illustrates how the dynamic model mathematically approximates the work string as a set of interconnected point lumped masses.

FIG. 2B-2C, described in more detail below, illustrate one implementation of the dynamic model 216. FIG. 2B pictorially illustrates how the dynamic model 216 approximates the work string 218 as a set of interconnected point lumped masses 220a-220j.

Referring again to FIG. 2A, the force profile estimator 206 provides the observer 204 with point friction forces ($\hat{F}_D[j]$) 222 associated with the point lumped masses 220a-220j of the dynamic model 216. The dynamic model 216 of the observer 204 uses the foregoing inputs 212,214,222 to compute a numerical solution procedure for a certain set of differential equations, which produces outputs 224 for the current estimated position ($\hat{Z}$) and estimated velocity ($\dot{\hat{Z}}$) for each of the point lumped masses 220a-220j. The estimated position and velocity of each of the point lumped masses 220a-220j is then mapped to the actual position and velocity of the work string 218. As the work string 218 is conveyed along the wellbore, the observer 204 may increment (when moving in the downhole direction 226 of FIG. 2B) or decrement (when moving in the uphole direction 228 of FIG. 2B) the number of point lumped masses 220a-220j of the dynamic model 216 to maintain optimal accuracy of the position and velocity estimation outputs 224, or may change the properties of the masses to account for work string length changes.

FIG. 2C pictorially illustrates how the dynamic model 216 mathematically approximates the work string 218 as a set of interconnected point lumped masses 220a-220j. The subscript j is used to identify the current point lumped mass (e.g., 220c) of interest for the following equations of motion, while subscripts j+1, j−1, and so on are used to identify the point lumped one position downhole (e.g., 220d), one position uphole (e.g., 220b), and so on of the current point lumped mass (e.g., 220c). Further, the number of overdot accents for a term indicates the derivative order. For example, a single overdot accent (e.g., $\dot{x}$) indicates the first derivative of the term, the double overdot accent (e.g., $\ddot{x}$) indicates the second derivative, and so on.

Eq. (1) provides an exemplary equation of motion for the $j^{th}$ mass, which is mass 220c as illustrated.

$$m_j \ddot{x}_j = -b_j(\dot{x}_j - \dot{x}_{j-1}) + b_{j+1}(\dot{x}_{j+1} - \dot{x}_j) - k_j(x_j - x_{j-1}) + k_{j+1}(x_{j+1} - x_j) - \hat{F}_D[j] - F_g - F_p - k_j \propto (\Delta T_j) l_j + k_{j+1} \propto (\Delta T_{j+1}) l_{j+1} \quad (1)$$

where:
- $m_j$ is a mass of the $j^{th}$ section of the work string
- $x_j$ is a displacement distance of the $j^{th}$ section of the work string measured from a nominal position
- $k_j$ is an axial spring constant of the $j^{th}$ section of the work string (defined in Eq. (2))
- $b_j$ is an axial damping coefficient of the $j^{th}$ section of the work string (defined in Eq. (3))
- $\hat{F}_D$ is a point friction force
- $F_g$ is a force due to gravity (defined in Eq. (4))
- $F_p$ is a force due to pressure difference between the internal and external of the work string
- $\Delta T_j$ is a change in kinetic energy
- $l_j$ is a length of the $j^{th}$ section of the work string $$k_j = \frac{EA_j}{l_j} \quad (2)$$

where:

E is a modulus of elasticity of the work string acting as a spring $A_j$ is a unequalized area of the work string acting as a spring $$b_j = 2\zeta\sqrt{k_j \tfrac{1}{2}(m_{j-1}+m_j)} \quad (3)$$

where:

$\zeta$ is a damping ratio $$F_g = g\pi(r_{od}^2 - r_{id}^2)(\rho_{steel} - \rho_{mud}) \quad (4)$$

where:

g is gravitational acceleration $r_{od}$ is an outside radius of the string $r_{id}$ is an inside radius of the string $\rho_{steel}$ is a density of steel (or other material the $j^{th}$ section of the work string is composed of)

$\rho_{mud}$ is a density of the drilling mud

For a 3-mass system as illustrated in FIG. 2C, the velocity ($v_j$) of the $j^{th}$ mass 220c equals the first derivative of the displacement as defined in Eq. (5), which produces the matrices in Eq. (6).

$$v_j = \dot{x}_j \quad (5)$$

$$\begin{bmatrix} \dot{x}_1 \\ \dot{v}_1 \\ \dot{x}_2 \\ \dot{v}_2 \\ \dot{x}_3 \\ \dot{v}_3 \end{bmatrix} = \begin{bmatrix} 0 & 1 & 0 & 0 & 0 & 0 \\ \frac{-(k_1+k_2)}{m_1} & \frac{-(b_1+b_2)}{m_1} & \frac{k_2}{m_1} & \frac{b_2}{m_1} & 0 & 0 \\ 0 & 0 & 0 & 1 & 0 & 0 \\ \frac{k_2}{m_2} & \frac{b_2}{m_2} & \frac{-(k_2+k_3)}{m_2} & \frac{-(b_2+b_3)}{m_2} & \frac{k_3}{m_2} & \frac{b_3}{m_2} \\ 0 & 0 & 0 & 0 & 0 & 1 \\ 0 & 0 & \frac{k_3}{m_3} & \frac{b_3}{m_3} & \frac{-k_3}{m_3} & \frac{-b_3}{m_3} \end{bmatrix} \quad (6)$$

$$+ \begin{bmatrix} 0 & 0 & 0 & 0 & 0 & 0 & 0 & 0 & 0 & 0 \\ \frac{k_1}{m_1} & \frac{b_1}{m_1} & \frac{1}{m_1} & -1 & \frac{1}{m_1} & 0 & 0 & \frac{-k_1\alpha l_1}{m_1} & \frac{-k_2\alpha l_2}{m_1} & 0 \\ 0 & 0 & 0 & 0 & 0 & 0 & 0 & 0 & 0 & 0 \\ 0 & 0 & \frac{1}{m_2} & -1 & 0 & \frac{1}{m_2} & 0 & 0 & \frac{-k_2\alpha l_2}{m_2} & \frac{-k_3\alpha l_3}{m_2} \\ 0 & 0 & 0 & 0 & 0 & 0 & 0 & 0 & 0 & 0 \\ 0 & 0 & \frac{1}{m_3} & -1 & 0 & 0 & \frac{1}{m_3} & 0 & 0 & \frac{-k_3\alpha l_3}{m_3} \end{bmatrix} \begin{bmatrix} x_1 \\ v_1 \\ x_2 \\ v_2 \\ x_3 \\ v_3 \end{bmatrix}$$

$$\begin{bmatrix} Z_{SF} \\ Z_{SF} \\ F_{pressure} \\ g(\rho_{steel}-\rho_{mud})/\rho_{steel} \\ \hat{F}_D[1] \\ \hat{F}_D[2] \\ \hat{F}_D[3] \\ \Delta T_1 \\ \Delta T_2 \\ \Delta T_3 \end{bmatrix}$$

The force exerted by the positioning tool system ($F_{TH}$) can be related to state variables and inputs 212, 214, 222 by Eq. (7).

$$F_{TH} = \begin{bmatrix} k_1 & b_1 & 0 & 0 & 0 & 0 \end{bmatrix} \begin{bmatrix} x_1 \\ v_1 \\ x_2 \\ v_2 \\ x_3 \\ v_3 \end{bmatrix} = \begin{bmatrix} -k_1 & -b_1 & 0 & 0 & 0 & 0 & 0 & k_1\alpha l_1 & 0 & 0 \end{bmatrix} \begin{bmatrix} Z_{SF} \\ Z_{SF} \\ F_{pressure} \\ g(\rho_{steel} - \rho_{mud})/\rho_{steel} \\ \hat{F}_D[1] \\ \hat{F}_D[2] \\ \hat{F}_D[3] \\ \Delta T_1 \\ \Delta T_2 \\ \Delta T_3 \end{bmatrix} \quad (7)$$

For clarity, each of the foregoing matrices are abbreviated as provided in Table 1, which allows Eqs. (6) and (7) to be condensed to Eqs. (8) and (9).

TABLE 1

| A | $\begin{bmatrix} 0 & 1 & 0 & 0 & 0 & 0 \\ \frac{-(k_1+k_2)}{m_1} & \frac{-(b_1+b_2)}{m_1} & \frac{k_2}{m_1} & \frac{b_2}{m_1} & 0 & 0 \\ 0 & 0 & 0 & 1 & 0 & 0 \\ \frac{k_2}{m_2} & \frac{b_2}{m_2} & \frac{-(k_2+k_3)}{m_2} & \frac{-(b_2+b_3)}{m_2} & \frac{k_3}{m_2} & \frac{b_3}{m_2} \\ 0 & 0 & 0 & 0 & 0 & 1 \\ 0 & 0 & \frac{k_3}{m_3} & \frac{b_3}{m_3} & \frac{-k_3}{m_3} & \frac{-b_3}{m_3} \end{bmatrix}$ |
|---|---|
| B | $\begin{bmatrix} 0 & 0 & 0 & 0 & 0 & 0 & 0 & 0 & 0 & 0 \\ \frac{k_1}{m_1} & \frac{b_1}{m_1} & \frac{1}{m_1} & -1 & \frac{1}{m_1} & 0 & 0 & \frac{-k_1\alpha l_1}{m_1} & \frac{-k_2\alpha l_2}{m_1} & 0 \\ 0 & 0 & 0 & 0 & 0 & 0 & 0 & 0 & 0 & 0 \\ 0 & 0 & \frac{1}{m_2} & -1 & 0 & \frac{1}{m_2} & 0 & 0 & \frac{-k_2\alpha l_2}{m_2} & \frac{-k_3\alpha l_3}{m_2} \\ 0 & 0 & 0 & 0 & 0 & 0 & 0 & 0 & 0 & 0 \\ 0 & 0 & \frac{1}{m_3} & -1 & 0 & 0 & \frac{1}{m_3} & 0 & 0 & \frac{-k_3\alpha l_3}{m_3} \end{bmatrix}$ |
| C | $[k_1\; b_1\; 0\; 0\; 0\; 0]$ |
| D | $[-k_1\; -b_1\; 0\; 0\; 0\; 0\; 0\; k_1\alpha l_1\; 0\; 0]$ |
| U | $\begin{bmatrix} Z_{SF} \\ Z_{SF} \\ F_{pressure} \\ g(\rho_{steel}-\rho_{mud})/\rho_{steel} \\ \hat{F}_D[1] \\ \hat{F}_D[2] \\ \hat{F}_D[3] \\ \Delta T_1 \\ \Delta T_2 \\ \Delta T_3 \end{bmatrix}$ |

TABLE 1-continued

| X | $\begin{bmatrix} x_1 \\ v_1 \\ x_2 \\ v_2 \\ x_3 \\ v_3 \end{bmatrix}$ |
|---|---|

$$\dot{X} = AX + BU \quad (8)$$

$$F_{TH} = CX + DU \quad (9)$$

By considering the traveling head force command ($F^*_{TH}$) as the measured ($F_{TH}$), it is possible to construct a full state observer according to Eq. (10).

$$\dot{\hat{X}} = (A - LC)\hat{X} + B - LD)U + LF^*_{TH} \quad (10)$$

where:
L is a gain matrix, which is chosen so that the estimate $\hat{X}$ converges to the actual state X within a desired amount of drill time A Kalman filter may be used within the dynamic model 216 to improve the robustness of the observer 204 performance against surface sensor noise, downhole sensor noise (when downhole sensors are implemented), and process (or model) noise.

Referring again to FIG. 2A, the force profile estimator 206 receives the outputs 224 (i.e., the estimated position ($\hat{Z}$), estimated velocity ($\dot{Z}$), and the mass ($m_j$) for each of the point lumped masses 220a-220j from Eq. (1) from the observer 204). The force profile estimator 206, also, receives or otherwise obtains the traveling head distribution force ($\hat{F}_D$) 230 from the work string controller 202. The force profile estimator 206 records the disturbance friction forces and point friction forces associated each depth in lowering the work string for the first time of a certain service job of a particular well. These data are then used to predict the friction force trend in subsequent travel through the same depth. More specifically, the force profile estimator 206 estimates the equivalent frictional forces ($\hat{F}_D[j]$) for each of the point lumped masses 220a-220j of the dynamic model 216 using the traveling head distribution force ($\hat{F}_D$) 230 and estimates stresses of the work string sections represented by the point lumped masses 220a-220j (also referred to as the string stress profile ($[\sigma_j]$) using the outputs 224 from the observer 204.

The force profile estimator 206 provides outputs 230 that comprise the string stress profile ($[\sigma_j]$) and the predicted disturbance frictional force ($\hat{F}_D$) to the rate planner 208 and provides outputs 222 that comprise the point friction forces ($\hat{F}_D[j]$) to observer, as described above.

The rate planner 208 receives a discrete sequence of desired downhole position ($Z^*_{DH}[k]$) and velocity ($\dot{Z}^*_{DH}[k]$) commands needed for the wellbore operations being performed. The $Z^*_{DH}[k]$ and $\dot{Z}^*_{DH}[k]$ commands are provided by the operators of the well or an associated computer or model. The rate planner 208 then computes the desired downhole position ($\tilde{Z}^*_{DH}$) and the desired downhole velocity ($\dot{\tilde{Z}}^*_{DH}$) signals to realize the commanded positions and accelerations without causing the $[\sigma_j]$ to violate the safe stress levels of the work string. The computed $\tilde{Z}^*_{DH}$ and $\dot{\tilde{Z}}_{DH}$ to achieve the commanded positions are the outputs 232 of the rate planner 208 that are received by the controller 210.

The predicted disturbance friction force ($\hat{F}_D$) may optionally then be used to smooth the performance of the applied downhole force to avoid overloading of the work string. Using the predicted disturbance force in the work string controller 202 as the feedforward signal 234 may reduce the stick/slip behavior that causes the downhole force to fluctuate and lead to early failure. In some instances, the rate planner 208 may slow down the work string motion if the disturbance shows an increasing pattern of stick/slip behavior that is difficult to control or estimate. The filtered predicted disturbance force is added to the observer 204 feedforward as part of the traveling head force command 214 ($F^*_{TH}$) of work string controller 202.

The controller 210 uses an appropriate control algorithm (such as a proportional-integral-derivative control algorithm) to compute the surface position ($Z^*_{SF}$) and surface velocity ($\dot{Z}^*_{SF}$) required to obtain the desired downhole position ($\tilde{Z}^*_{DH}$) and velocity ($\dot{\tilde{Z}}^*_{DH}$). The $Z^*_{SF}$ and the $\dot{Z}^*_{SF}$ are outputs 236 of the downhole position and velocity controller 200 via the controller 210 that are received by the work string controller 202.

The work string controller 202 uses the various outputs from the downhole position and velocity controller 200 (e.g., the $Z^*_{SF}$ and the $\dot{Z}^*_{SF}$ outputs 236 from the controller 210 and the predicted disturbance friction force ($\hat{F}_D$) from the rate planner 208) as inputs to control the movement and position of the work string via a set of surface position commands ($Z_{SF}$) and a set of surface velocity commands (($\dot{Z}^*_{SF}$) 238 that are transmitted to the positioning tool controlling the surface motion and force (e.g., a dual-jack).

FIGS. 2A-2C and the corresponding description provide examples of a method, a computational architecture, and algorithms for executing the embodiments of the present disclosure. In some instances, other algorithms or computational architectures may be used that accounts for force compensation when determining the surface position ($\tilde{Z}^*_{SF}$) and velocity ($\dot{\tilde{Z}}^*_{SF}$) outputs 236 of the downhole position and velocity controller 200.

It is recognized that the various embodiments herein directed to control systems, computer control, and analyses, including various blocks, modules, elements, components, methods, and algorithms, can be implemented using computer hardware, software, combinations thereof, and the like. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments described herein include Embodiment A, Embodiment B, Embodiment C, Embodiment D, and Embodiment E.

Embodiment A is a method comprising: conveying a work string along a wellbore penetrating a subterranean formation using a positioning tool that controls surface motion and force of the work string, the positioning tool being coupled to a controller; measuring a surface condition selected from the group consisting of a work string condition, a wellbore pressure, a wellbore temperature, and any combination thereof; modeling the well string with a dynamic model with the controller using the surface condition and a geometry of the wellbore as inputs of the dynamic model; calculating a desired downhole position ($\tilde{Z}^*_{DH}$) and a desired downhole velocity ($\dot{Z}^*_{DH}$) based on the dynamic model; and conveying the work string with the positioning tool to a surface position and velocity based on the $\tilde{Z}^*_{DH}$ and the $\dot{Z}^*_{DH}$. Optionally, Embodiment A may further include one or more of the following: Element 1: wherein the positioning tool is a dual-jack; Element 2: wherein the work string condition is selected from the group consisting of strain of the work string, torque applied to the work string, rotational speed of the work string, acceleration of the work string being conveyed into the wellbore, velocity of the work string being conveyed into the wellbore, positon of the work string, force applied to move the work string along the wellbore, and any combination thereof; Element 3: the method further comprising: measuring a downhole condition with a downhole sensor located within the wellbore, wherein the inputs for the dynamic model further include the downhole condition; Element 4: wherein modeling the well string with a dynamic model involves estimating the well string as a set of interconnected point lumped masses; Element 5: wherein the controller comprises a downhole position and velocity controller and a work string controller, and the method further comprising: calculating a traveling head force command ($F^*_{TH}$) of the positioning tool with the work string controller; wherein calculating the $\tilde{Z}^*_{DH}$ and the $\dot{Z}^*_{DH}$ is also based on the $F^*_{TH}$ and is performed by the downhole position and velocity controller; calculating a set of surface position commands ($Z^*_{SF}$) and a set of surface velocity commands ($\dot{Z}^*_{SF}$) based on the $\tilde{Z}^*_{DH}$ and the $\dot{Z}^*_{DH}$ with the work string controller; and wherein conveying the work string with the positioning tool is according to the $\dot{Z}^*_{SF}$ and the $\dot{Z}^*_{SF}$; Element 6: Element 5 and wherein the downhole position and velocity controller comprises an observer, a force profile estimator, a rate planner, and a controller, and wherein calculating the desired downhole position and velocity of the work string as performed by the downhole position and velocity controller comprises: calculating a current estimated position ($\hat{Z}$) and estimated velocity ($\dot{\hat{Z}}$) with the observer based on the set of interconnected point lumped masses, the surface condition, and the traveling head force command; calculating a string stress profile ($[\sigma_j]$) and a predicted disturbance frictional force ($\check{F}_D$) for the work string with the force profile estimator based on the $\hat{Z}$ and the $\dot{\hat{Z}}$; calculating the $\tilde{Z}^*_{DH}$ and the $\dot{Z}^*_{DH}$ for the work string with the rate planner based on the $[\sigma_j]$ and the $\check{F}_D$; calculating a surface position ($Z^*_{SF}$) and a surface velocity ($\dot{Z}^*_{SF}$) of the work string with the controller to produce the $\tilde{Z}^*_{DH}$ and the $\dot{Z}^*_{DH}$; converting the $\dot{Z}^*_{SF}$ and the $\dot{Z}^*_{SF}$ to the set of surface position commands ($Z^*_{SF}$) and the set of surface velocity commands ($\dot{Z}^*_{SF}$); Element 7: wherein modeling the well string includes modeling the motion of a $j^{th}$ section of the well string according to Eq. (1); and Element 8: wherein the dynamic model employs a Kalman filter. Exemplary combinations may include, but are not limited to, two or more of Elements 1-4 in combination; one or more of Elements 1-4 in combination with Element 5 and optionally Element 6; one or more of Elements 1-4 in combination with Element 7; one or more of Elements 1-4 in combination with Element 8; Element 8 in combination with Element 5 and optionally Element 6; Element 8 in combination with Element 7; and two or more of Elements 5-8 in combination.

Embodiment B is a well system comprising: a work string extending into a wellbore penetrating subterranean formation; a positioning tool coupled to the work string at a surface location of the well system; a surface sensor that measures a surface condition selected from the group consisting of a work string condition, a wellbore pressure, a wellbore temperature, and any combination thereof; a controller communicably coupled to the positioning tool and the surface sensor, wherein the controller includes a non-transitory, tangible, computer-readable storage medium: containing a program of instructions that cause a computer system running the program of instructions to: perform Embodiment A optionally with one or more of Elements 1-8.

Embodiment C is a non-transitory, tangible, computer-readable storage medium: containing a program of instructions that cause a computer system running the program of instructions to: perform Embodiment A optionally with one or more of Elements 1-8.

Embodiment D is a well system comprising: a work string extending into a wellbore penetrating subterranean formation; a positioning tool coupled to the work string at a surface location of the well system; a surface sensor that measures a surface condition selected from the group consisting of a work string condition, a wellbore pressure, a wellbore temperature, and any combination thereof; a controller communicably coupled to the positioning tool and the surface sensor, wherein the controller includes a non-transitory, tangible, computer-readable storage medium: containing a program of instructions that cause a computer system running the program of instructions to: model the well string with a dynamic model with the controller using the surface condition and a geometry of the wellbore as inputs of the dynamic model; calculate a desired downhole position ($\tilde{Z}^*_{DH}$) and a desired downhole velocity ($\dot{Z}^*_{DH}$) based on the dynamic model; and convey the work string with the positioning tool to a surface position and velocity based on the $\tilde{Z}^*_{DH}$ and the $\dot{Z}^*_{DH}$.

Embodiment E is a non-transitory, tangible, computer-readable storage medium: containing a program of instructions that cause a computer system running the program of instructions to: model a well string with a dynamic model with a controller using a surface condition and a geometry of a wellbore as inputs of the dynamic model; calculate a desired downhole position ($\tilde{Z}^*_{DH}$) and a desired downhole velocity ($\dot{Z}^*_{DH}$) based on the dynamic model; and convey the work string with the positioning tool to a surface position and velocity based on the $\tilde{Z}^*_{DH}$ and the $\dot{Z}^*_{DH}$.

Embodiments D and E may optionally include one or more of the following: Element 9: wherein the positioning tool is a dual-jack; Element 10: wherein the work string condition is selected from the group consisting of strain of the work string, torque applied to the work string, rotational speed of the work string, acceleration of the work string being conveyed into the wellbore, velocity of the work string being conveyed into the wellbore, positon of the work string, force applied to move the work string along the wellbore, and any combination thereof; Element 11: wherein the controller comprises a downhole position and velocity controller and a work string controller, and the program of instructions that further cause a computer system running the program of instructions to: calculate a traveling head force command ($F^*_{TH}$) of the positioning tool with the work string controller; wherein the instruction to calculate the $\tilde{Z}^*_{DH}$ and the $\dot{Z}^*_{DH}$ is also based on the $F^*_{TH}$ and is performed by the downhole position and velocity controller; calculate a set of surface position commands ($Z^*_{SF}$) and a set of surface velocity commands ($\dot{Z}^*_{SF}$) based on the $\tilde{Z}^*_{DH}$ and the $\dot{Z}^*_{DH}$ with the work string controller; and the instruction to convey the work string with the positioning tool is according to the $\dot{Z}^*_{SF}$ and the $\dot{Z}^*_{SF}$; Element 12: Element 11 and wherein the downhole position and velocity controller comprises an observer, a force profile estimator, a rate planner, and a controller, and wherein the instruction to calculate the desired downhole position and velocity of the work string as performed by the downhole position and velocity controller includes: calculate a current estimated position ($\hat{Z}$) and estimated velocity ($\dot{\hat{Z}}$) with the observer based on the set of interconnected point lumped masses, the surface condition, and the traveling head force command; calculate a string stress profile ([$\sigma_j$]) and a predicted disturbance frictional force ($\check{F}_D$) for the work string with the force profile estimator based on the $\hat{Z}$ and the $\dot{\hat{Z}}$; calculate the $\tilde{Z}^*_{DH}$ and the $\dot{Z}^*_{DH}$ for the work string with the rate planner based on the [$\sigma_j$] and the $\check{F}_D$; calculate a surface position ($Z^*_{SF}$) and a surface velocity ($\dot{Z}^*_{SF}$) of the work string with the controller to produce the $\tilde{Z}^*_{DH}$ and the $\dot{Z}^*_{DH}$; and convert the $\dot{Z}^*_{SF}$ and the $\dot{Z}^*_{SF}$ to the set of surface position commands ($Z^*_{SF}$) and the set of surface velocity commands ($\dot{Z}^*_{SF}$); Element 13: wherein the instruction to model the well string with the dynamic model as a set of interconnected point lumped masses accounting for downhole forces includes instructions to model the motion of a $j^{th}$ section of the well string according to Eq. (1); and Element 14: wherein the instruction to dynamically model the well string as a set of interconnected point lumped masses accounting for downhole forces employs a Kalman filter. Exemplary combinations may include, but are not limited to, Elements 9 and 10 in combination; one or both of Elements 9 and 10 in combination with Element 11 and optionally Element 12; one or both of Elements 9 and 10 in combination with Element 13; one or both of Elements 9 and 10 in combination with Element 14; and two or more of Elements 11-14 in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    conveying a work string along a wellbore penetrating a subterranean formation using a positioning tool that controls surface motion and force of the work string, the positioning tool being coupled to a controller;
    measuring a surface condition selected from the group consisting of a work string condition, a wellbore pressure, a wellbore temperature, and any combination thereof;
    modeling the work string with a dynamic model with the controller using the surface condition and a geometry of the wellbore as inputs of the dynamic model;
    calculating a desired downhole position ($\tilde{Z}^*_{DH}$) and a desired downhole velocity ($\dot{Z}^*_{DH}$) based on the dynamic model;
    calculating a surface position ($Z^*_{SF}$) and a surface velocity ($\dot{Z}^*_{SF}$) of the work string based on the $\tilde{Z}^*_{DH}$ and the $\dot{Z}^*_{DH}$, and
    conveying the work string with the positioning tool to the surface position and the surface velocity.

2. The method of claim 1, wherein the positioning tool is a dual-jack.

3. The method of claim 1, wherein the work string condition is selected from the group consisting of strain of the work string, torque applied to the work string, rotational speed of the work string, acceleration of the work string being conveyed into the wellbore, velocity of the work string being conveyed into the wellbore, position of the work string, force applied to move the work string along the wellbore, and any combination thereof.

4. The method of claim 1 further comprising:
measuring a downhole condition with a downhole sensor located within the wellbore, wherein the inputs for the dynamic model further include the downhole condition.

5. The method of claim 1, wherein modeling the work string with the dynamic model involves estimating the work string as a set of interconnected point lumped masses.

6. The method of claim 1, wherein the controller comprises a downhole position and velocity controller and a work string controller, and the method further comprising:
calculating a traveling head force command ($F^*_{TH}$) of the positioning tool with the work string controller;
wherein calculating the $\tilde{Z}^*_{DH}$ and the $\dot{Z}^*_{DH}$ is also based on the $F^*_{TH}$ and is performed by the downhole position and velocity controller;
calculating a set of surface position commands ($Z_{SF}$) and a set of surface velocity commands ($\dot{Z}_{SF}$) based on the $\tilde{Z}^*_{DH}$ and the $\dot{Z}^*_{DH}$ with the work string controller; and
wherein conveying the work string with the positioning tool is according to the set of surface position commands ($Z_{SF}$) and the set of surface velocity commands ($\dot{Z}_{SF}$).

7. The method of claim 6, wherein the downhole position and velocity controller comprises an observer, a force profile estimator, a rate planner, and a second controller, and wherein calculating the desired downhole position and velocity of the work string as performed by the downhole position and velocity controller comprises:
calculating a current estimated position ($\hat{Z}$) and estimated velocity ($\dot{\hat{Z}}$) with the observer based on a set of interconnected point lumped masses, the surface condition, and the traveling head force command;
calculating a string stress profile ($[\sigma_j]$) and a predicted disturbance frictional force ($\hat{F}_D$) for the work string with the force profile estimator based on the $\hat{Z}$ and the $\dot{\hat{Z}}$;
calculating the $\tilde{Z}^*_{DH}$ and the $\dot{Z}^*_{DH}$ for the work string with the rate planner based on the $[\sigma_j]$ and the $\hat{F}_D$;
producing the $\tilde{Z}^*_{DH}$ and the $\dot{Z}^*_{DH}$ based on the surface position ($Z^*_{SF}$) and the surface velocity ($\dot{Z}^*_{SF}$); and
converting the $Z^*_{SF}$ and the $\dot{Z}^*_{SF}$ to the set of surface position commands ($Z_{SF}$) and the set of surface velocity commands ($\dot{Z}_{SF}$).

8. The method of claim 1, wherein modeling the work string includes modeling the motion of a $j^{th}$ section of the work string according to Eq. (1):

$$m_j \ddot{x}_j = -b_j(\dot{x}_j - \dot{x}_{j-1}) + b_{j+1}(\dot{x}_{j+1} - \dot{x}_j) - k_j(x_j - x_{j-1}) + k_{j+1}(x_{j+1} - x_j) - \hat{F}_D[j] - F_g - F_p - k_j \alpha (\Delta T_j) l_j + k_{j+1} \alpha (\Delta T_{j+1}) l_{j+1} \quad (1)$$

where:
$m_j$ is a mass of the $j^{th}$ section of the work string $x_j$ is a displacement distance of the $j^{th}$ section of the work string measured from a nominal position
$k_j$ is an axial spring constant of the $j^{th}$ section of the work string
$b_j$ is an axial damping coefficient of the $j^{th}$ section of the work string
$\hat{F}_D$ is a point friction force
$F_g$ is a force due to gravity
$F_p$ is a force due to pressure difference between the internal and external of the work string
$\Delta T_j$ is a change in kinetic energy
$l_j$ is a length of the $j^{th}$ section of the work string.

9. The method of claim 1, wherein the dynamic model employs a Kalman filter.

10. A well system comprising:
a work string extending into a wellbore penetrating subterranean formation;
a positioning tool coupled to the work string at a surface location of the well system;
a surface sensor that measures a surface condition selected from the group consisting of a work string condition, a wellbore pressure, a wellbore temperature, and any combination thereof;
a controller communicably coupled to the positioning tool and the surface sensor, wherein the controller includes a non-transitory, tangible, computer-readable storage medium: containing a program of instructions that causes a computer system running the program of instructions to:
model the work string with a dynamic model with the controller using the surface condition and a geometry of the wellbore as inputs of the dynamic model;
calculate a desired downhole position ($\tilde{Z}^*_{DH}$) and a desired downhole velocity ($\dot{Z}^*_{DH}$) based on the dynamic model;
calculate a surface position ($Z^*_{SF}$) and a surface velocity ($\dot{Z}^*_{SF}$) of the work string based on the ($\tilde{Z}^*_{DH}$ and the $\dot{Z}^*_{DH}$, and
convey the work string with the positioning tool to the surface position and the surface velocity.

11. The well system of claim 10, wherein the positioning tool is a dual-jack.

12. The well system of claim 10, wherein the work string condition is selected from the group consisting of strain of the work string, torque applied to the work string, rotational speed of the work string, acceleration of the work string being conveyed into the wellbore, velocity of the work string being conveyed into the wellbore, position of the work string, force applied to move the work string along the wellbore, and any combination thereof.

13. The well system of claim 10, wherein the controller comprises a downhole position and velocity controller and a work string controller, and wherein the program of instructions further causes the computer system running the program of instructions to:
calculate a traveling head force command ($F^*_{TH}$) of the positioning tool with the work string controller;
wherein the instruction to calculate the $\tilde{Z}^*_{DH}$ and the $\dot{Z}^*_{DH}$ is also based on the $F^*_{TH}$ and is performed by the downhole position and velocity controller;
calculate a set of surface position commands ($Z_{SF}$) and a set of surface velocity commands ($\dot{Z}_{SF}$) based on the $\tilde{Z}^*_{DH}$ and the $\dot{Z}^*_{DH}$ with the work string controller; and
wherein the instruction to convey the work string with the positioning tool is according to the set of surface position commands ($Z_{SF}$) and the set of surface velocity commands ($\dot{Z}_{SF}$).

14. The well system of claim 13, wherein the downhole position and velocity controller comprises an observer, a force profile estimator, a rate planner, and a second controller, and wherein the instruction to calculate the desired downhole position and velocity of the work string as performed by the downhole position and velocity controller includes:
calculate a current estimated position ($\hat{Z}$) and estimated velocity ($\dot{\hat{Z}}$) with the observer based on a set of interconnected point lumped masses, the surface condition, and the traveling head force command;

calculate a string stress profile ($[\sigma_j]$) and a predicted disturbance frictional force ($\check{F}_D$) for the work string with the force profile estimator based on the $\hat{Z}$ and the $\hat{\dot{Z}}$;

calculate the $\tilde{Z}^*_{DH}$ and the $\tilde{\dot{Z}}^*_{DH}$ for the work string with the rate planner based on the $[\sigma_j]$ and the $\check{F}_D$;

produce the $\tilde{Z}^*_{DH}$ and the $\tilde{\dot{Z}}^*_{DH}$ based on the surface position ($Z^*_{SF}$) and the surface velocity ($\dot{Z}^*_{SF}$); and convert the $Z^*_{SF}$ and the $\dot{Z}^*_{SF}$ to the set of surface position commands ($Z_{SF}$) and the set of surface velocity commands ($\dot{Z}_{SF}$).

15. The well system of claim 10, wherein the instruction to model the work string with the dynamic model includes instructions to model the motion of a $j^{th}$ section of the work string according to Eq. (1):

$$m_j \ddot{x}_j = -b_j(\dot{x}_j - \dot{x}_{j-1}) + b_{j+1}(\dot{x}_{j+1} - \dot{x}_j) - k_j(x_j - x_{j-1}) + k_{j+1}(x_{j+1} - x_j) - \check{F}_D[j] - F_g - F_p - k_j \propto (\Delta T_j)l_j + k_{j+1} \propto (\Delta T_{j+1})l_{j+1} \quad (1)$$

where:
- $m_j$ is a mass of the $j^{th}$ section of the work string $x_j$ is a displacement distance of the $j^{th}$ section of the work string measured from a nominal position
- $k_j$ is an axial spring constant of the $j^{th}$ section of the work string
- $b_j$ is an axial damping coefficient of the $j^{th}$ section of the work string
- $\check{F}_D$ is a point friction force
- $F_g$ is a force due to gravity
- $F_p$ is a force due to pressure difference between the internal and external of the work string
- $\Delta T_j$ is a change in kinetic energy
- $l_j$ is a length of the $j^{th}$ section of the work string.

16. The well system of claim 10, wherein the instruction to model the work string with the dynamic model comprises estimating the work string as a set of interconnected point lumped masses accounting for downhole forces, wherein the dynamic model employs a Kalman filter.

17. The well system of claim 10, further comprising a downhole sensor located within the wellbore, wherein the program of instructions further causes the computer system running the program of instructions to measure a downhole condition with the downhole sensor.

18. A non-transitory, tangible, computer-readable storage medium containing a program of instructions that causes a computer system running the program of instructions to:
- model a work string with a dynamic model with a controller using a surface condition and a geometry of a wellbore as inputs of the dynamic model;
- calculate a desired downhole position ($\tilde{Z}^*_{DH}$) and a desired downhole velocity ($\tilde{\dot{Z}}^*_{DH}$) based on the dynamic model;
- calculate a surface position ($Z^*_{SF}$) and a surface velocity ($\dot{Z}^*_{SF}$) of the work string based on the $\tilde{Z}^*_{DH}$ and the $\tilde{\dot{Z}}^*_{DH}$, and
- convey the work string with a positioning tool to the surface position and the surface velocity.

19. The non-transitory, tangible, computer-readable storage medium of claim 18, further containing instructions to:
- calculate a traveling head force command ($F^*_{TH}$) of the positioning tool with a work string controller;
- wherein the instruction to calculate the $\tilde{Z}^*_{DH}$ and the $\tilde{\dot{Z}}^*_{DH}$ is also based on the $F^*_{TH}$ and is performed by a downhole position and velocity controller;
- calculate a set of surface position commands ($Z_{SF}$) and a set of surface velocity commands ($\dot{Z}_{SF}$) based on the $\tilde{Z}^*_{DH}$ and the $\tilde{\dot{Z}}^*_{DH}$ with the work string controller; and
- wherein the instruction to convey the work string with the positioning tool is according to the set of surface position commands ($Z_{SF}$) and the set of surface velocity commands ($\dot{Z}_{SF}$).

20. The non-transitory, tangible, computer-readable storage medium of claim 19, further comprising instructions to:
- calculate a current estimated position ($\hat{Z}$) and estimated velocity ($\hat{\dot{Z}}$) with an observer based on a set of interconnected point lumped masses, the surface condition, and the traveling head force command;
- calculate a string stress profile ($[\sigma_j]$) and a predicted disturbance frictional force ($\check{F}_p$) for the work string with a force profile estimator based on the $\hat{Z}$ and the $\hat{\dot{Z}}$;
- calculate the $\tilde{Z}^*_{DH}$ and the $\tilde{\dot{Z}}^*_{DH}$ for the work string with a rate planner based on the $[\sigma_j]$ and the $\check{F}_D$;
- produce the $\tilde{Z}^*_{DH}$ and the $\tilde{\dot{Z}}^*_{DH}$ based on the surface position ($Z^*_{SF}$) and the surface velocity ($\dot{Z}^*_{SF}$); and
- convert the $Z^*_{SF}$ and the $\dot{Z}^*_{SF}$ to the set of surface position commands ($Z_{SF}$) and the set of surface velocity commands ($\dot{Z}_{SF}$).

* * * * *